United States Patent Office 3,746,568
Patented July 17, 1973

3,746,568

NOBLE METAL, GLASS BINDER COMPOSITIONS AND METHODS OF USING SAME

Frederick Rybarczyk, Toledo, Ohio, assignor to Owens-Illinois, Inc., Toledo, Ohio No Drawing. Filed Mar. 11, 1971, Ser. No. 123,413
Int. Cl. B44d 1/46
U.S. Cl. 117—95 21 Claims

ABSTRACT OF THE DISCLOSURE

A peel-back resistant composition useful to form a die-bonding pad in microelectronic circuitry is provided. The composition comprises by weight about 94–98% particulate noble metal and about 2–6% by weight of a glass binder. The glass binder consists of a fritted particulate glass formed from a composition comprising by weight about; 75–89% PbO, 10–15% $B_2O_3$, 1–8% BaO and 0–6% $SiO_2$. The particulate composition is readily formed into a printing paste using an organic vehicle and is fireable at about 550–1000° C. to a nonpeeling pad or coating.

This invention relates to compositions of glass admixed with noble metals and methods of using same. More particularly, this invention relates to noble metal glas binder compositions useful as binding substrates in ceramic cavities in the microelectronics art.

Delicate electronic and microelectronic devices are often packaged or otherwise encapsulated in a protective ceramic structure generally comprised of a base member having a cavity therein and a lid or closure cap for sealing the cavity after the delicate microelectronic device is located therein. Because of the extremely high fusion temperature of the known ceramics, it is often impossible to heat seal the electronic or microelectronic devices directly to the bottom surface of the ceramic cavity. In addition, the conventional ceramics are often chemically and physically incompatible with the materials of the electronic or microelectronic devices, thus rendering it impossible to form a strong bond directly between the devices and the substrate. For these reasons, intermediate bonding materials have been developed to fulfill the need.

One of the most prevalantly used intermediate bonding materials is an admixture of a noble metal and a glass binder which when applied to the bottom surface of the ceramic cavity and heated to its firing temperature (i.e. the temperature at which the glass binder will flow and the noble metal coalesce to form a substantially solid, non-porous body) forms a pad or coating upon the ceramic. Because of the nature of the glass binder a bond is formed with the ceramic at relatively low temperatures and because of the presence of noble metal which often migrates during firing to the surface of the pad, a bond is formable with the electronic or microelectronic devices also at relatively low temperatures.

The most prevalant technique for applying these intermediate bonding materials is to initially formulate them into a paste by admixing the particles of noble metal and glass binder with an organic vehicle usually consisting of a liquid solvent (carrier) and an organic binder. The paste is then applied to the cavity by drop, screen, or other conventional techniques. After application, the paste is heated to a relatively low temperature usually about 100–200° C. to evaporate the solvent and then is heated through a somewhat higher temperature, to burn off the organic binder, to its firing temperature, usually on the order of about 500–1000° C., to form the final structure.

Unfortunately, while these paste compositions and techniques are quite useful and represent the preferred manner of application to obtain the desired coating, they tend to form an extensive miniscus over almost the entire length and depth of the walls of the cavity. While such a miniscus is fully acceptable and compatible with the system provided that it adheres to the walls, it is a characteristic of the prior art compositions that during firing of the paste, the miniscus tends to pull away from the walls and thus form fragile solid miniscuses which extend into the cavity area. This problem is known as "peel-back" in the art. Peel-back of the miniscus may occur only partially along the depth of the cavity wall or it may occur to the extent that a gap between the pad and the wall exists along the entire length and depth thereof. While such peel-back is not necessarily unacceptable in and of itself, the tendency of the peeled back miniscus to flake or crack from the body of the coating gives rise to some serious problems. For example, such a flake, if present in the sealed device, may cause shorting of the electronic or microelectronic device within the cavity and/or it may actually damage the device and/or leads extending therefrom. This problem of peel-back is especially detrimental in microelectronic assemblies wherein a multilead silicon chip integrated circuit is encapsulated within the ceramic structure. Not only is shorting a very real problem if a peel-back miniscus flakes off, but actual physical damage to the microleads can occur.

In an attempt to remedy this peel-back problem it has been a prevalent practice in the art to highly dilute the solids content of the paste with excess solvent. This has the effect of minimizing the size of the miniscus and thus, while it does not eliminate peel-back, it does at least reduce the size of the miniscus such that the likelihood of peel-back flaking is reduced. Unfortunately this remedy to the peel-back problem is not only costly because of certain application problems, but it also has attendant with it the inability to form thick pads or coatings because of the rather low solids content of the paste (often on the order of less than about 54% by weight of the paste composition). Since thickness is necessary to insure good bonding, the thin films (sometimes on the order of less than 100 microinches in thickness) formed by this prior art solution to peel-back are not always acceptable and in certain instances are inoperative.

In view of the above, it is evident that there exists a need in the art for a new composition which can be formed into a nonpeel-back coating or pad and which is of the requisite thickness for its intended purpose. This invention fulfills this need in the art.

Generally speaking this invention fulfills this need in the art by providing a particulate composition of a noble metal and a glass binder having a fiber softening point sufficiently low such that the glass binder will start to flow and adhere to the walls of the ceramic at about the temperature at which the organic binder in a paste formed from the composition is burned off.

Although this invention is not limited to any theory, it is believed to be a finding of this invention that the problem of peel-back is primarily caused by the organic binder burning off at a temperature too premature to the temperature at which the glass binder starts to flow. Thus, when the organic binder burns off, the coating at its miniscus can no longer hold its shape and thus tends to fall away from rather than adhere to the walls of the cavity to the extent that upon firing, a separated miniscus is formed. By employing, then a glass binder composition which flows during organic binder burn off, the problem of a peel-back is mitigated or eliminated depending upon the extent to which the glass binder flows.

Conventional organic binders such as the various ethyl celluloses (e.g. N-4 to N-200) generally burn off between about 200–500° C. such that during normal firing cycles wherein a temperature gradient of about 20–40°

C./min. is employed to allow for gentle binder burn off, peel-back will occur if glass binder flow does not significantly occur to wet the ceramic walls at less than about 475° C. Such a requirement usually means that the glass binder must have a fiber softening point of less than about 450° C. and preferably less than about 400° C. Once given this discovery of this invention the occurrence of peel-back in prior art coatings is readily understood since the glass binder compositions thereof usually have fiber softening points on the order of about 500–525° C.

The term "fiber softening point" is used herein in accordance with its well known meaning in the art. Such a term is generally defined as that point at which a glass reaches a viscosity of $10^{7.65}$ poises.

As alluded to above, by employing glass binders having the requisite fiber softening points and which are sufficiently compatible with the cavity material to form a tenacious bond therewith, a coating composition is provided which reduces and in many instances substantially eliminates the problem of peel-back.

A particularly preferred type of glass binder for use in this invention and one which fulfills the above-described requirements is a particulate lead, barium, borate glass formed by conventional batch and melting techniques from a composition, on a theoretical oxide basis which comprises by weight about: 75–89% PbO, 10–15% $B_2O_3$, 1–8% BaO, and 0–6% $SiO_2$. Such glasses have a fiber softening point of less than about 450° C. and form strong bonds with conventional ceramics, particularly alumina.

These glass compositions may contain other compatible metal oxides such as ZnO, CaO, $Na_2O$, $K_2O$, MgO, $Sb_2O_3$, SnO and the like which are added to the batch for their known effects or are present in the batch as impurities. Generally speaking, however, these oxides should not exceed about 5% by weight of the glass composition, preferably not exceeding about 1% and in the most preferred embodiments are not present or are present in less than a trace amount such that it may be said that the glass binder consists of the 3 or 4 major oxides as listed.

A particularly preferred glass binder compositional range for the purposes of this invention comprises by weight about: 80–85% PbO, 11–13.5% $B_2O_3$, 2–6% BaO, and 0.2–4% $SiO_2$ wherein these oxides comprise at least about 99% of said composition. A preferred glass within this preferred range consists of by weight percent about : 82% PbO, 13% $B_2O_3$, 4% BaO and 1% $SiO_2$. Such a glass has a fiber softening point of about 350° C.

Any of the noble metal systems conventionally employed in the art and which give rise to the problem of peel-back are contemplated for use in the compositions of this invention. Such systems include the use of a single noble metal alone or a series of 2 or more noble metals usually in alloy form. Examples of such systems include Pd-Au, Pt-Au, Pd, Pd-Ag, Ag-Au, and the like. A particularly preferred system for the purposes of this invention is a gold (Au) system wherein gold is used as the only noble metal.

The basic compositions contemplated by this invention comprise an admixture of a particulate noble metal, preferably particulate gold, and particles of the aforementioned glass binder, preferably those enumerated of the barium-lead-borate type. While the amount of noble metal to glass binder and the particle size of each constituent may vary over a wide range depending upon the ultimate environmental use of the composition, it has been generally found that for purposes of forming a screen printable paste for use in forming bonding pads in ceramic substrates which are to encapsulate microelectronic components, the noble metal should constitute at least about 50% by weight of the composition, and preferably greater than about 90%, with the glass binder preferably constituting the remaining weight percent. In a particularly preferred embodiment of this invention, wherein the composition is to be used to form a gold die-bonding pad for a silicon chip integrated circuit the particulate glass binder usually comprises about 2–6% by weight of the composition while the particulate gold usually comprises about 94–98% by weight of the composition. Most preferably the weight percents are about 4% and 96% respectively.

The particle sizes employed for these compositions are those conventionally and currently used in the art. Generally speaking, and if the composition is to be applied in paste form, the particle size of both the noble metal and glass binder should be less than about 5 microns and preferably less than about 1 micron.

The above-described compositions of this invention are readily formed into pastes by admixing them with an organic vehicle comprised of an organic solvent and an organic binder. The term "solvent" as used herein is an art term used in its broadest sense. When actually used in these systems it does not dissolve any of the constituents but rather merely serves as a liquid carrier. Because the glass binders have fiber softening points less than about 450° C. and preferably less than about 400° C., conventional solvents (liquid carriers) and binders may be employed.

Examples of such solvents include the various alcohols, pine oil, and the like. A particularly preferred solvent for the purposes of this invention is diethylene glycol monobutyl ether acetate used alone or employed in a 2/1 weight ratio with isoamyl salicylate. This preferred solvent or liquid carrier lends to the paste excellent flow characteristics especially for screen printing and is easily and fully removed from the system at temperatures of 100–200° C.

Examples of organic binders include various gums, natural celluloses, and the like. A particularly preferred organic binder is ethyl cellulose, and more particularly N–200 ethyl cellulose, since they are capable of holding dimensional stability at sufficiently high temperatures and for sufficient periods of time to allow adequate flow of the glass binders to occur during conventional firing cycles, in most instances sufficiently to aid in substantially eliminating any significant amount of peel-back from occurring. These binders usually burn off during conventional firing cycles at temperatures between 200–500° C. The organic binder is usually employed in an amount of about 5–10% by weight of the vehicle while the solvent is used in an amount of about 90–95% whereby good screen printing viscosities are achieved.

The amount of organic vehicle and solids (particulate composition) employed will, of course, vary widely depending upon the ultimate use and thickness of the coating to be formed. Generally speaking, however, it may be stated that dilution with vehicle to the extensive degree of the prior art (generally greater than about 46%) does not have to be effected in order to prevent or mitigate peel-back. Quite to the contrary, this invention in a preferred embodiment forms a paste comprising by weight about 55–75% solid particulate matter and 45–25% vehicle and thereby achieves pad thickness of not only acceptable but excellent depth without attendant peel-back. For example, in the preferred gold system and silicon chip die-bonding pad environment hereinabove described thicknesses of about 100–500 microinches or more are achieved using greater than about 55% by weight and preferably about 65% by weight particulate matter without any substantial amount of peel-back occurring. Amounts higher than 75% particulate matter can be used but because the thicknesses achieved at lower weight percents are usually more than adequate, use of higher amounts are not economically justified.

The paste compositions of this invention so formed are useful in a wide variety of areas where peel-back is a problem. However, as stated above a preferred environment for the purposes of this invention is a substrate cavity ultimately employed to house a microelectronic device. Such ceramic cavities may be of any configuration and of any conventional material. Examples of ceramic materials which may be employed are steatite, alumina, forsterite, cordietrite, porcelain, mullite, zirconia and the like. Alumina is preferred for the purposes of this invention. A particularly preferred cavity configuration, not necessarily of ceramic and not necessarily used in the above preferred environment, is disclosed in my copending application Ser. No. 123,201 filed concurrent herewith (Mar. 11, 1971) and entitled Cavity Structure. The entire disclosure of this copending application is incorporated herein by reference.

There is disclosed in this copending application a unique structure cavity design which reduces, and in many instances substantially eliminates, peel-back by itself. Such a cavity is defined by a bottom surface and surrounding walls wherein the angle formed at the junction of said walls and bottom surface is rounded or obtused to a degree sufficient to at least substantially limit peel-back. Preferably the junction between adjoining walls is also rounded and/or obtused to this degree as well. When the unique compositions of this invention are employed in combination wth these unique structures, peel-back is virtually eliminated.

Regardless of the environment into which the paste of this invention are actually placed they are usually applied by conventional techniques such as dropping, screen printing or the like. After application of the paste, the coated object is heated to a relatively low temperature (e.g. about 100–200° C.) and held for a period of time sufficient to remove substantially all of the liquid carrier (5–20 minutes). Thereafter, the temperature is raised at a rate usually about 20–40° C./min. through the organic binder burn off temperature range (usually about 200–500° C.) to the firing temperature (about 500–1000° C.) and preferably about 650° C. wherein at the final structure is formed. The term "firing temperature" is used herein in accordance with its well known meaning in the art as defined hereinabove. Such a term may also be defined as that temperature at which the glass binder reaches a viscosity of $10^{14}$ poises. The cooled pad is found to form a substantially non-peeling tightly adherent coating upon the structure which it contacts.

The following example is presented by way of illustration rather than limitation.

EXAMPLE

An organic liquid solvent (i.e. a liquid carrier) was formed by admixing 2 parts by weight of diethylene glycol monobutyl ether acetate with 1 part by weight isoamyl salicylate. 92.2 parts by weight of this solvent were admixed with 7.8 parts by weight of N–200 ethyl cellulose to form an organic vehicle.

35 parts by weight of the so formed vehicle were admixed with 65 parts by weight of a particulate material having an average particle size of just under about 1 micron. The particulate material employed consisted of a thoroughly blended mixture of 94 parts by weight gold particles (Englehard A1570) and 6 parts by weight particles of a glass binder having a composition on a theoretical oxide basis of, by weight percent: 82.00% PbO, 12.75% $B_2O_3$, 4.25% BaO, and 1.00% $SiO_2$. The glass had a fiber softening point of 351° C. and a coefficient of thermal expansion of $129.6\times10^{-7}$/° C. from 0–300° C. This admixture of vehicle and particles were thoroughly blended in a 3 roll mill, 3 times to form a printing paste having a viscosity of about 100,000 cps.

The paste was then screen printed into a cavity having the design of FIGS. 3 and 5 in the aforesaid copending application. The rectangle was a substantial square having an upper (or outer) wall length of 0.150 inch and a lower (or inner) wall length of 0.134. The height of the cavity was about 0.005 inch and the horizontal corner round (radius) for all corners was 0.020 inch. A coined 200 mesh screen was employed for the printing and the coin was designed to conform to the cavity for ease of printing. Screening of the paste composition resulted in a coating of the paste over the entire bottom surface and a continuous miniscus covering substantially the entire surface of all the surrounding four walls.

The coated ceramic structure was then placed in a furnace and heated through the following schedule:

(1) room temp.–200° C., 10 min., solvent removed
(2) 200–400° C., 10 min., binder removed
(3) 400–650° C., 10 min. to peak, fired; 8 min. at peak, structure
(4) cool down, 10 min., final product, 400 microinches The resulting structure upon visible inspection was found to be completely free of any peel-back areas and was used to form an excellent die-bonding pad for a 14 lead silicon chip integrated circuit.

When the above procedure is conducted using the same technique as described but using the prior art substrate illustrated in FIGS. 1–2 of the aforesaid copending application, a substantial reduction in peel-back is achieved to the extent that peel-back is no longer a significant problem. This structure too is found to form an excellent die-bonding pad for a 14 lead silicon chip integrated circuit.

Once given the above disclosure many other features, modifications, and improvements will become apparent to the skilled artisan. Such other features, modifications, and improvements are therefore considered a part of this invention the scope of which is to be detrimined by the following claims.

I claim:

1. A particulate composition comprised of a noble metal and a glass binder having a fiber softening point sufficiently low such that the glass binder will exhibit sufficient flow to prevent peel-back of a coating of said composition from its substrate at about the temperature at which an organic binder in a paste formed from the composition and applied as said coating is burned off, wherein said noble metal is gold and said glass binder is comprised of by weight about: 75–89% PbO, 10–15% $B_2O_3$, 1–8% BaO, and 0–6% $SiO_2$, said oxides comprising at least about 99% by weight of said glass binder, said noble metal comprising at least 50% by weight of said composition.

2. A particulate composition according to claim 1 wherein said glass binder has a fiber softening point of less than about 450° C.

3. A particulate composition according to claim 2 wherein said organic binder is an ethyl cellulose which burns off between about 200–500° C.

4. A particulate composition according to claim 1 wherein said glass binder comprises by weight about: 80–85% PbO, 11–13.5% $B_2O_3$, 2–6% BaO and 0.2–4% $SiO_2$, said oxides comprising at least about 99% by weight of said glass binder.

5. A particulate composition according to claim 4 wherein said glass binder consists of by weight about: 82% PbO, 13% $B_2O_3$, 4% BaO, and 1% $SiO_2$.

6. A particulate composition according to claim 5 wherein said glass binder has a fiber softening point of about 350° C.

7. A particulate composition according to claim 4 wherein said glass binder has a fiber softening point of less than about 400° C.

8. A particulate composition according to claim 4 wherein the average particle size of all constituents is less than about 5 microns.

9. A particulate composition according to claim 4 wherein the glass binder has a fiber softening point of less than about 450° C.

10. A particulate composition according to claim 4 wherein said noble metal is in an amount of about 94–98% by weight of said composition and said glass binder is in an amount of about 2–6% by weight of said composition.

11. A particulate composition according to claim 4 wherein said noble metal is gold and said gold is employed in an amount of about 96% by weight of said composition and said glass binder is in an amount of about 4% by weight of said composition.

12. A paste comprising (a) an organic vehicle comprising a liquid carrier and an organic binder and (b) the particulate composition of claim 4.

13. A paste in accordance with claim 12 wherein said organic vehicle comprises no more than about 45% by weight of said paste.

14. A paste in accordance with claim 13 wherein said organic vehicle is comprised of diethylene glycol monobutyl ether acetate and isoamyl salicylate as said liquid carrier and ethyl cellulose as an organic binder.

15. A paste in accordance with claim 14 wherein said particulate composition has a particle size of less than about 1 micron, said noble metal is gold, said gold constitutes about 94–96% by weight of said particulate matter, said particulate matter constitutes about 55–75% by weight of said paste, said glass binder has a fiber softening point of less than about 450° C., and said organic binder comprises about 5–10% by weight of said vehicle.

16. A coating on a substrate exhibiting substantially no peel-back formed from the paste of claim 12.

17. A coating on a substrate exhibiting substantially no peel-back formed from the paste of claim 15.

18. A method of forming a tightly adhering coating on a substrate which exhibits substantially no peel-back comprising forming a layer of the paste of claim 12 on said substrate and heating said layer at a rate to a firing temperature sufficient to remove substantially all organic constituents from said layer and form a strong, adherent, glass-noble metal coating thereof.

19. A method according to claim 18 wherein said substrate is a ceramic cavity defined by a bottom and surrounding walls and said coating contacts said bottom and forms a nonpeeling miniscus on said walls.

20. A method according to claim 19 wherein said ceramic is alumina and said coating is a gold-die bonding pad capable of having attached thereto a silicon chip integrated circuit.

21. A method according to claim 20 wherein an angle formed at the junction of said walls and bottom surface is rounded or obtused to a degree sufficient to at least substantially limit peel-back, and the junction between adjoining walls is rounded or obtused to a degree sufficient to at least substantially aid in limiting peel-back.

References Cited

UNITED STATES PATENTS

| | | | |
|---|---|---|---|
| 3,075,860 | 1/1963 | Veres | 117—227 X |
| 3,374,110 | 3/1968 | Miller | 106—1 X |
| 3,413,240 | 11/1968 | Short | 106—1 X |
| 3,440,062 | 4/1969 | Hoffman | 106—1 |
| 3,537,892 | 11/1970 | Milkorich et al. | 106—1 X |
| 3,080,328 | 3/1963 | Billian | 252—514 X |
| 3,554,796 | 1/1971 | Liederback et al. | 252—514 X |

EDWARD G. WHITBY, Primary Examiner

U.S. Cl. X.R.

106—1; 117—227, 125, 169 R, 169 A; 252—514

UNITED STATES PATENT AND TRADEMARK OFFICE

CERTIFICATE OF CORRECTION

PATENT NO. : 3,746,568

DATED : July 17, 1973

INVENTOR(S) : Frederick Rybarczyk

It is certified that error appears in the above-identified patent and that said Letters Patent are hereby corrected as shown below:

Col. 1, line 27, change "glas" to --glass--; Col. 1, line 35, change "temperature" to --temperatures--; Col. 1, line 58, change spelling of "prevalant" to --prevalent--. Col. 3, line 32, after "CaO" insert --$ZrO_2$--; Col. 3, line 56, after "Pd-Ag" insert --Ag--. Col. 5, line 14, change "structure" to --structural--; Col. 6, line 30, change "detrimined" to --determined--.

Signed and Sealed this

Nineteenth Day of April 1977

[SEAL]

Attest:

RUTH C. MASON
*Attesting Officer*

C. MARSHALL DANN
*Commissioner of Patents and Trademarks*